(12) United States Patent
Thompson

(10) Patent No.: US 7,431,550 B2
(45) Date of Patent: Oct. 7, 2008

(54) PIPE HANDLING APPARATUS FOR PICK-UP AND LAY-DOWN MACHINE

(75) Inventor: Carroll R. Thompson, The Woodlands, TX (US)

(73) Assignee: Technologies Alliance, Houston, TX (US)

( * ) Notice: Subject to any disclaimer, the term of this patent is extended or adjusted under 35 U.S.C. 154(b) by 212 days.

(21) Appl. No.: 10/679,702

(22) Filed: Oct. 3, 2003

(65) Prior Publication Data

US 2004/0131449 A1    Jul. 8, 2004

Related U.S. Application Data

(63) Continuation-in-part of application No. PCT/US03/13767, filed on May 2, 2003.

(60) Provisional application No. 60/416,210, filed on Oct. 4, 2002.

(51) Int. Cl.
*E21B 19/24* (2006.01)
(52) U.S. Cl. ............... 414/22.54; 414/22.61; 175/85
(58) Field of Classification Search .......... 414/22.54, 414/22.57–22.61, 22.65, 22.68, 22.71; 415/22.57; 157/85; 175/85; 294/86.1
See application file for complete search history.

(56) References Cited

U.S. PATENT DOCUMENTS

| | | | |
|---|---|---|---|
| 1,805,007 A | | 5/1931 | Pedley |
| 2,416,815 A | * | 3/1947 | Calhoun ............. 414/22.63 |
| 2,450,934 A | * | 10/1948 | Calhoun ............. 166/77.53 |
| 2,536,458 A | | 1/1951 | Munsinger |
| 2,590,639 A | | 3/1952 | Moser |
| 2,753,744 A | | 7/1956 | Therien |
| 2,803,434 A | * | 8/1957 | Heinish ............. 173/40 |
| 3,023,651 A | | 3/1962 | Wallace |
| 3,212,593 A | * | 10/1965 | Reischl ............. 175/85 |
| RE26,284 E | * | 10/1967 | O'Niell ............. 175/57 |
| 3,477,527 A | | 11/1969 | Koot |
| 3,651,959 A | * | 3/1972 | Castela et al. ............. 414/22.58 |
| 3,795,326 A | * | 3/1974 | Neilon et al. ............. 414/22.58 |

(Continued)

FOREIGN PATENT DOCUMENTS

EP    234880 A2 *    9/1987

(Continued)

OTHER PUBLICATIONS

Extreme conditions, extended-reach wells govern land-rig design for Sakhalin Mike Sumrow. Oil & Gas Journal. Tulsa: Jun. 17, 2002. vol. 100, Iss. 24; p. 41.*

(Continued)

*Primary Examiner*—Saul J. Rodriguez
*Assistant Examiner*—Charles Greenhut
(74) *Attorney, Agent, or Firm*—Patterson & Sheridan, LLP

(57) ABSTRACT

The present invention generally relates to a method and apparatus for handling a tubular above a wellbore. In one aspect, the present invention provides a pipe handling apparatus operable with a pipe pick-up and lay-down machine. The pipe handling apparatus includes at least one arm having a first end and a second end and at least one stop member coupled to the second end of the arm. Preferably, the first end is pivotally coupled to the pipe pick-up and lay-down machine. The pipe handling apparatus may be actuated to limit movement of the tubular as it is moved toward the wellbore.

11 Claims, 10 Drawing Sheets

U.S. PATENT DOCUMENTS

| | | | | | |
|---|---|---|---|---|---|
| 3,831,258 | A | | 8/1974 | Bjalme et al. | |
| 3,860,126 | A | * | 1/1975 | Neimark et al. | 414/22.71 |
| 3,892,148 | A | | 7/1975 | Wiley | |
| 4,029,215 | A | | 6/1977 | Birdwell | |
| 4,030,746 | A | * | 6/1977 | Langowski | 294/88 |
| 4,192,206 | A | | 3/1980 | Schulze-Beckinghausen | |
| 4,274,778 | A | * | 6/1981 | Putnam et al. | 414/22.71 |
| 4,295,527 | A | * | 10/1981 | Russe | 166/380 |
| 4,297,922 | A | | 11/1981 | Higdon | |
| 4,304,433 | A | * | 12/1981 | Langowski | 294/106 |
| 4,333,365 | A | | 6/1982 | Perry | |
| 4,371,302 | A | * | 2/1983 | Frias et al. | 414/22.61 |
| 4,379,676 | A | * | 4/1983 | Frias | 414/745.8 |
| 4,382,738 | A | * | 5/1983 | Frias | 414/22.61 |
| 4,386,883 | A | * | 6/1983 | Hogan et al. | 414/22.61 |
| 4,397,605 | A | * | 8/1983 | Cowgill et al. | 414/22.71 |
| 4,403,897 | A | * | 9/1983 | Willis | 414/22.55 |
| 4,403,898 | A | * | 9/1983 | Thompson | 414/22.58 |
| 4,429,753 | A | | 2/1984 | Cushman | |
| 4,625,796 | A | * | 12/1986 | Boyadjieff | 166/77.52 |
| 4,652,195 | A | * | 3/1987 | McArthur | 414/22.51 |
| 4,696,207 | A | * | 9/1987 | Boyadjieff | 81/57.34 |
| 4,709,766 | A | * | 12/1987 | Boyadjieff | 175/52 |
| 4,744,596 | A | * | 5/1988 | Hiller et al. | 294/88 |
| 4,822,230 | A | * | 4/1989 | Slettedal | 414/22.54 |
| 4,834,604 | A | * | 5/1989 | Brittain et al. | 414/22.55 |
| 4,843,924 | A | | 7/1989 | Hauk | |
| 4,921,386 | A | * | 5/1990 | McArthur | 414/22.51 |
| 4,951,759 | A | * | 8/1990 | Richardson | 175/85 |
| 5,049,020 | A | * | 9/1991 | McArthur | 414/22.51 |
| 5,062,756 | A | * | 11/1991 | McArthur et al. | 414/22.51 |
| 5,127,790 | A | * | 7/1992 | Teague | 414/800 |
| 5,150,642 | A | | 9/1992 | Moody et al. | |
| 5,183,366 | A | * | 2/1993 | Paech | 414/22.52 |
| 5,451,129 | A | * | 9/1995 | Boyadjieff et al. | 414/22.61 |
| 5,458,454 | A | * | 10/1995 | Sorokan | 414/800 |
| 5,520,072 | A | | 5/1996 | Perry | |
| 5,537,900 | A | | 7/1996 | Schaar | |
| 5,609,457 | A | * | 3/1997 | Burns | 414/22.51 |
| 5,931,238 | A | * | 8/1999 | Gilmore et al. | 175/52 |
| 5,941,324 | A | * | 8/1999 | Bennett | 175/85 |
| 6,079,925 | A | * | 6/2000 | Morgan et al. | 414/22.57 |
| 6,116,118 | A | * | 9/2000 | Wesch, Jr. | 81/57.34 |
| 6,138,529 | A | * | 10/2000 | Pietras | 81/57.33 |
| 6,206,096 | B1 | | 3/2001 | Belik | |
| 6,220,807 | B1 | * | 4/2001 | Sorokan | 414/22.62 |
| 6,253,845 | B1 | | 7/2001 | Belik | |
| 6,330,911 | B1 | | 12/2001 | Allen et al. | |
| 6,336,381 | B2 | | 1/2002 | McDonnell | |
| 6,425,709 | B1 | | 7/2002 | Frijns | |
| 6,591,471 | B1 | * | 7/2003 | Hollingsworth et al. | 29/407.09 |
| 6,634,443 | B1 | * | 10/2003 | Paech et al. | 175/85 |
| 6,695,559 | B1 | * | 2/2004 | Pietras | 414/22.57 |
| 6,994,176 | B2 | | 2/2006 | Shahin et al. | |
| 6,997,265 | B2 | | 2/2006 | Berry | |
| 7,043,814 | B2 | | 5/2006 | Hollingsworth et al. | |
| 7,055,594 | B1 | | 6/2006 | Springett et al. | |
| 7,076,852 | B2 | | 7/2006 | Penman et al. | |
| 7,090,021 | B2 | | 8/2006 | Pietras | |
| 7,137,454 | B2 | | 11/2006 | Pietras | |
| 7,140,445 | B2 | | 11/2006 | Shahin et al. | |
| 7,188,547 | B1 | | 3/2007 | West et al. | |
| 7,191,686 | B1 | | 3/2007 | Angelle et al. | |
| 2004/0003490 | A1 | | 1/2004 | Shahin et al. | |
| 2004/0131449 | A1 | | 7/2004 | Thompson | |
| 2006/0104746 | A1 | | 5/2006 | Thompson | |
| 2006/0243488 | A1 | * | 11/2006 | Pietras | 175/52 |
| 2006/0285941 | A1 | | 12/2006 | Fikowski et al. | |

FOREIGN PATENT DOCUMENTS

| | | |
|---|---|---|
| EP | 0586297 | 3/1994 |
| EP | 1679462 | 10/2005 |
| FR | 2682449 | 4/1993 |

OTHER PUBLICATIONS

GB Search Report, Application No. GB 0323094.3, dated Jan. 20, 2004.

* cited by examiner

PIPE HANDLING APPARATUS FOR PICK-UP AND LAY-DOWN MACHINE

CROSS-REFERENCE TO RELATED APPLICATIONS

This application claims benefit of U.S. Provisional Patent Application Ser. No. 60/416,210, filed Oct. 4, 2002, and is also a continuation in part of International Patent Application PCT/US03/13767, filed May 2, 2003, which applications are herein incorporated by reference in their entirety.

BACKGROUND OF THE INVENTION

1. Field of the Invention

The present invention relates to pipe handling systems for handling a tubular pipe. More particularly, the present invention relates to a pipe positioning apparatus operable with a pipe pick-up and lay-down system for use in wellbore operations.

2. Description of the Related Art

In the drilling of oil and gas wells, it is known to employ various types of tubular pipe. Such pipes include drill pipe, drill collars, production tubing, well casing, and riser pipe. Such pipe is delivered to the drilling rig, and laid in individual joints horizontally upon a pipe rack. In the case of land wells, the pipe is typically delivered by a flat-bed truck. For offshore drilling, the pipe is delivered by barge or on a large floating vessel.

In order to use the pipe on the drilling rig, it is necessary to transport the pipe from the pipe rack to the rig floor. However, picking up and laying down drill pipe, casing and other tubular goods presents certain hazards to personnel on the rig floor. In addition, the manual handling of pipe, even with the assistance of wirelines, creates a risk that the pipe threads may be damaged. These concerns are magnified by the ever-increasing height of rig floors necessitated by the drilling of deeper wells.

Various patents have issued which provide pipe pick-up and lay-down systems. These systems typically involve the use of wirelines or cables to transport pipe from a pipe rack or truck bed to the rig floor. Such patents include:

U.S. Pat. No. 4,491,450 issued to George on Jan. 1, 1985;
U.S. Pat. No. 4,054,210 issued to Crocker on Sept. 29, 1975;
U.S. Pat. No. 4,099,630 issued to Beck on Jul. 11, 1978; and
U.S. Pat. No. 4,082,193 issued to Teague on Apr. 4, 1978.

These patents disclose systems that, while commonly used, require manual manipulation of pipes.

Other patents have attempted to reduce the involvement of rig hands in the handling of pipe by providing a trough for lifting pipe from the pipe rack to the rig floor. Such patents include:

U.S. Pat. No. 4,235,566 issued to Beaman, et al. on Nov. 25, 1980;
U.S. Pat. No. 4,403,898 issued to Thompson on Sep. 13, 1983; and
U.S. Pat. No. 4,552,498 issued to Dysarz on Nov. 12, 1985.

After a pipe is delivered to the rig floor using a pick-up and lay-down system, an elevator is attached to one end of the pipe to remove the pipe from the trough and place it above the wellbore. Once the elevator lifts the pipe from the trough, the free end of the pipe is manually positioned above the wellbore. Because the free end of the pipe is unsupported, this task generally presents a hazard to the personnel on the rig floor as they try to maneuver the pipe above the wellbore.

Therefore, it is desirable to provide a pipe handling apparatus operable with a pipe pick-up and lay-down system to assist with the positioning of the pipe above the rig floor. Further, it is desirable to provide a pipe handling apparatus operable with a pipe pick-up and lay-down system to control the movement of the free end of the pipe as it is lifted from the trough.

SUMMARY OF THE INVENTION

The present invention generally relates to a method and apparatus for handling a tubular above a wellbore. In one aspect, the apparatus is coupled to a tubular transport tool. The apparatus includes at least one arm actuatable to limit movement of the tubular as the tubular is removed from the tubular transport tool.

In another aspect, the present invention provides a pipe handling apparatus operable with a pipe pick-up and lay-down machine. The pipe handling apparatus includes at least one arm having a first end and a second end and at least one stop member coupled to the second end of the arm. Preferably, the first end is pivotally coupled to the pipe pick-up and lay-down machine. The pipe handling apparatus may be actuated to limit movement of the tubular as it is moved toward the wellbore.

In another aspect, the present invention provides a method of positioning a tubular above a wellbore. The method includes transporting the tubular to a position proximate the wellbore using a tubular transport tool. Then, the tubular is raised relative to the tubular transport tool. As the tubular is raised, the movement of the tubular is limited by a tubular handling apparatus. Thereafter, the tubular is positioned above the wellbore using the tubular transport tool.

In another aspect, the present invention provides a method of handling pipe in connection with wellbore operations. The method includes delivering the pipe to a point above the wellbore using a pipe pick-up and lay-down machine. Thereafter, a first end of the pipe is raised above the pipe pick-up and lay-down machine. Subsequently, a second end of the pipe is captured using a pipe handling apparatus coupled to the pipe pick-up and lay-down machine.

In another aspect, the present invention provides an apparatus for transporting a tubular. The apparatus includes a carriage for receiving the tubular and a tubular handling tool for limiting movement of the tubular as the tubular is removed from the carriage. Particularly, the apparatus further includes at least one arm having a first end and a second end, the first end being operatively coupled to the carriage and the second end actuatable to contact the tubular. In another embodiment, the apparatus may also include a ramp and a moving means to move the carriage, thereby delivering the tubular to a wellbore.

BRIEF DESCRIPTION OF THE DRAWINGS

So that the manner in which the above recited features of the present invention, and other features contemplated and claimed herein, are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
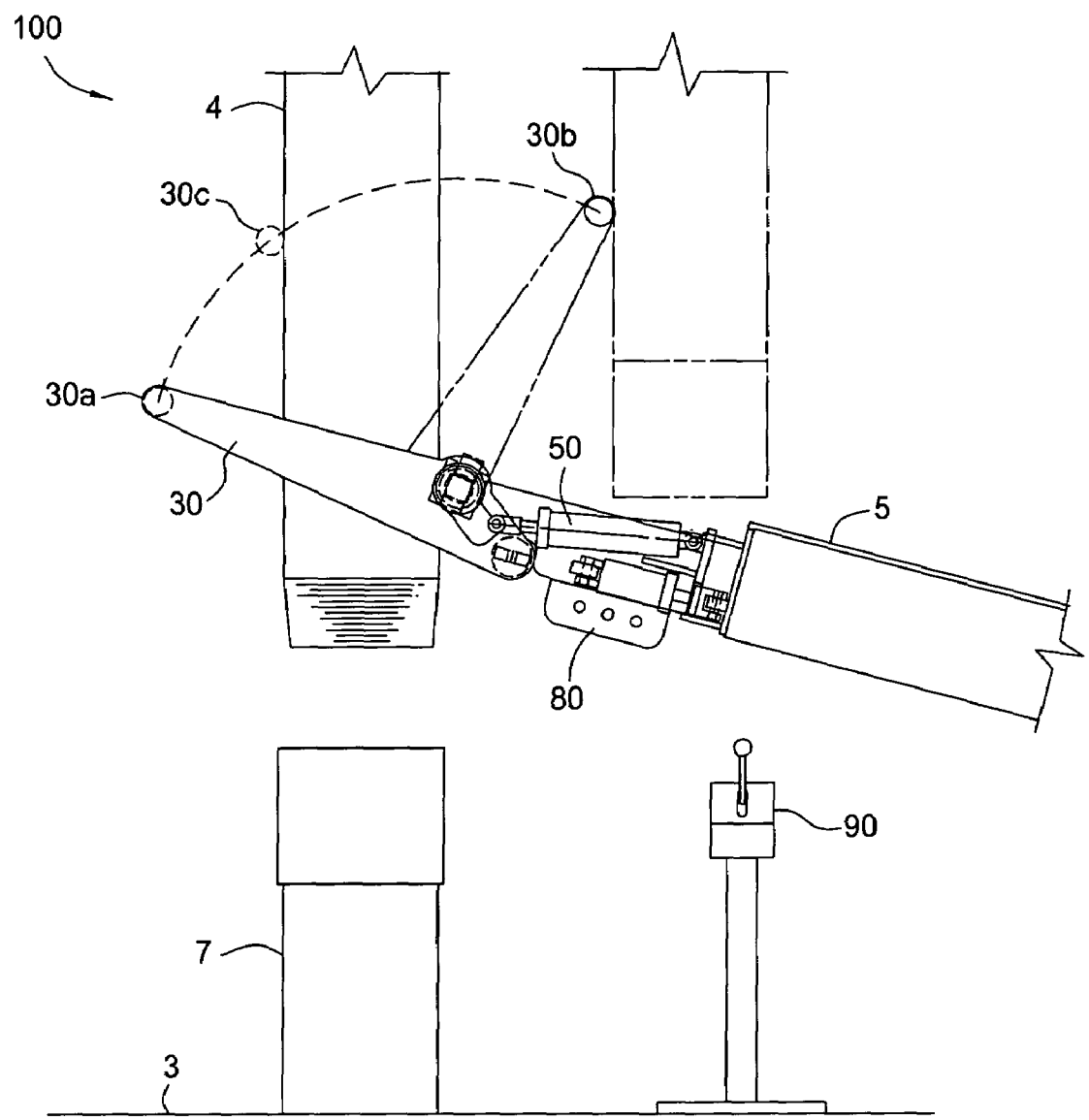
FIG. 1 is a side view a pipe handling apparatus according to aspects of the present invention.

FIG. 1 is a side view of one embodiment of a pipe handling apparatus 100 according to aspects of the present invention. The pipe handling apparatus 100 is shown attached to an end of a carriage 5. The carriage 5 is part of a tubular transport tool such as a pick-up and lay-down machine generally used to transport a pipe 4 to the rig floor 3. An example of a pick-up and lay-down machine is disclosed in International Patent Application PCT/US03/13767, filed May 2, 2003, which is incorporated herein by reference in its entirety. It must be noted that aspects of the pipe handling apparatus 100 are equally operable with other types of tubular transport tools as is known to a person of ordinary skill in the art.

Figure 8:
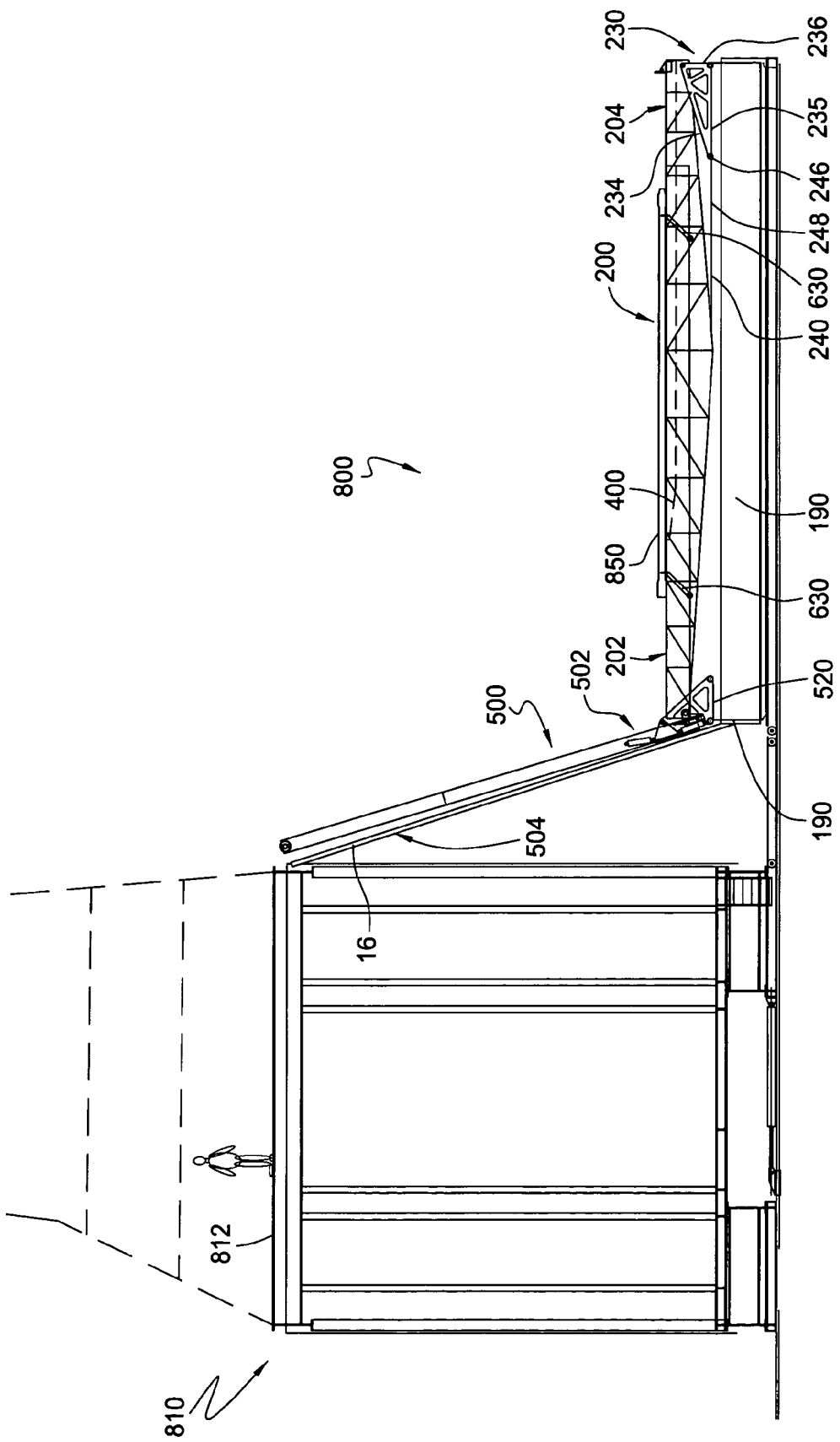
FIG. 8 is an enlarged side view of a tubular transport tool. The ramp has been unfolded into position against the drilling rig. The trestle is in its lower position, ready to be carried up the inclined ramp.

FIG. 8 presents an exemplary tubular transport tool 800 usable with the tubular handling apparatus of the present invention. In this view, the tubular transport tool 800 has been moved to a rig site, and is set up adjacent to a drilling rig 810. A portion of the drilling rig 810 is visible in FIG. 8, including the rig floor 812. The tubular transport tool 800 is designed to receive a joint of pipe 850 from a pipe rack at ground level, and deliver it to the rig floor 812 for further stacking and use during a drilling or workover operation.

FIG. 8 shows a side view of the tubular transport tool 800. In this view, two members of the tool 800 are discernable—a trestle 200 and a ramp 500. Two members of the carriage 5—a trough carrier 300 and a trough 400—are disposed within the trestle 200 and are not separately discernable in FIG. 8.

The trestle 200 of the tubular transport tool 800 serves as a cradle for the tubular 850. In the views shown in FIG. 8, the trestle 200 is in an essentially horizontal position. When situated for operation, the trestle 200 has a forward portion 202 proximate to the drilling rig 810, and a rear portion 204 distal to the drilling rig 810. Preferably, the trestle 200 is placed on the top of a catwalk 190 upon delivery to a rig site. Those of ordinary skill in the art will appreciate that most drilling sites, especially those on land, include a catwalk that serves as a staging area for transferring pipe 850 from various pipe racks to the rig floor 812. Typically, the catwalk 190 has an elevated solid platform that is of approximately the same height as the pipe racks.

The trestle 200 defines an elongated frame structure having a plurality of structural support members. Various structural support members are seen best in the cross-sectional view of FIG. 8B. First, longitudinal support members 214 are provided on either side of the trestle 200. The longitudinal support members 214 are secured together by horizontal frame members 215. Together, the various support members 214 and 215 form an open top, U-shaped truss. Thus, the trestle 200 includes an upper receiving surface, shown at 216 in FIG. 8B. In one aspect, the upper surface 216 is concave in configuration.

Figure 8A:
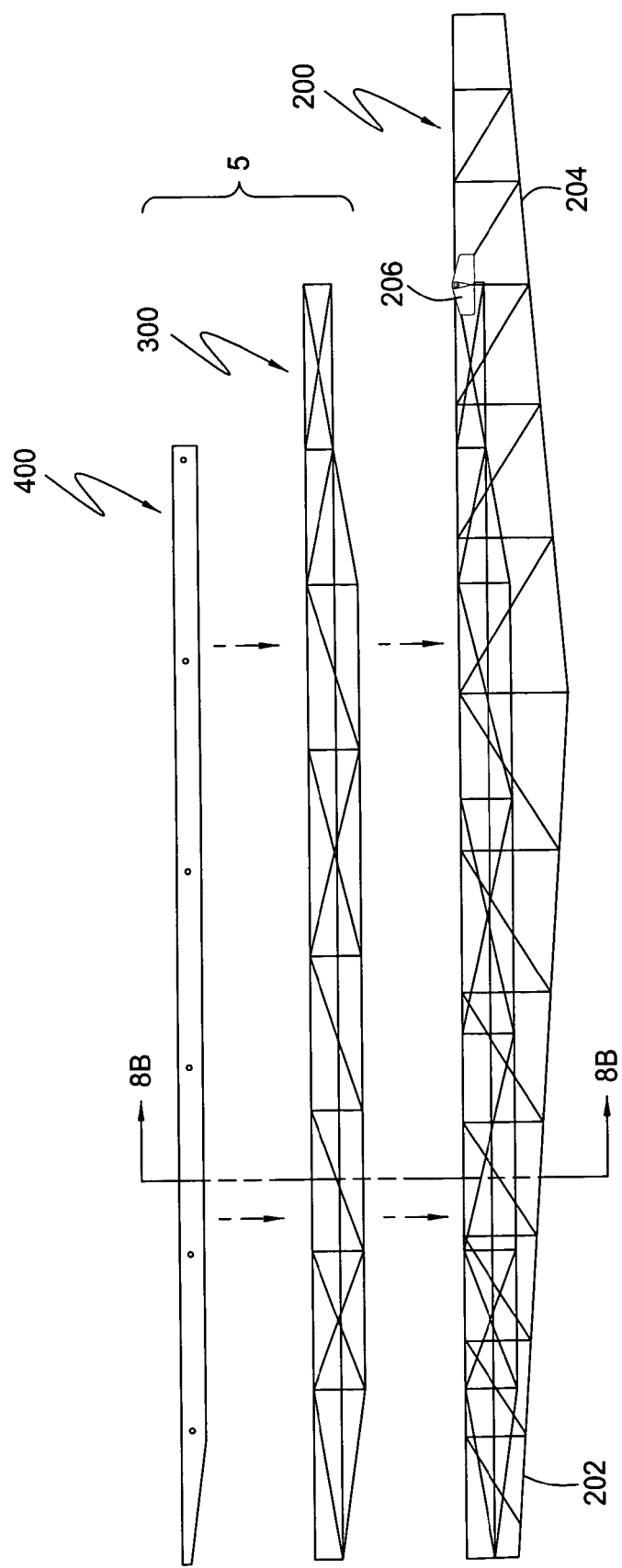
FIG. 8A is a side view of a trestle from the tubular transport tool of FIG. 8. A trough carrier frame and trough frame are shown exploded above the trestle frame. Arrows demonstrate that the trough is configured to reside within the trough carrier, and the trough carrier is configured to reside within the trestle.
Figure 8B:
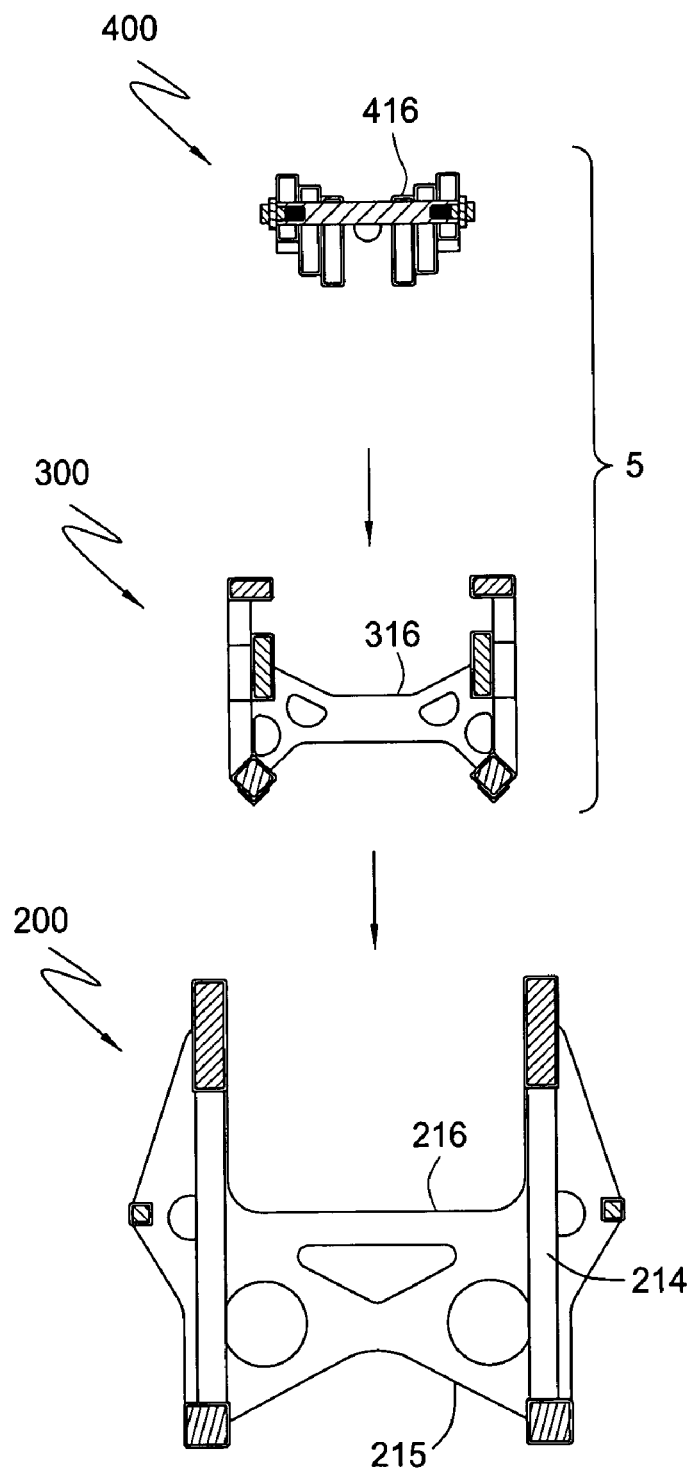
FIG. 8B presents cross-sectional views of the trestle, the trough carrier, and the trough of FIG. 8A. The views are taken across line 8B-8B of FIG. 8A. These views better demonstrate that the trough is configured to reside within the trough carrier, and the trough carrier in turn is configured to reside within the trestle.

The trestle 200 houses two separate frame members—a trough carrier 300 and a trough 400. The trough carrier 300 and the trough 400 are not visible in FIG. 8 as they are nested within the trestle 200. However, the trough carrier 300 and trough 400 are visible in FIGS. 8A and 8B. FIG. 8A is a side view of the trestle 200 from the tubular transport tool 800 of FIG. 8. FIG. 8B presents cross-sectional views of the trestle 200, the trough carrier 300, and the trough 400 of FIG. 8A. The views are taken across line 8B-8B. A trough carrier 300 and trough 400 are shown exploded above the trestle 200. Arrows demonstrate that the trough 400 is configured to reside within the trough carrier 300, and the trough carrier 300 is configured to reside within the trestle 200. More specifically, the trough carrier 300 is received upon the upper receiving surface 216 of the trestle 200, while the trough 400 is received upon an upper receiving surface 316 of the trough carrier 300. Features of the trough carrier 300 and the trough 400 will be discussed in more detail below.

The exemplary tubular transport device is preferably dimensioned to be received upon and transported by a flatbed trailer without necessity of a special DOT permit. In one aspect, and to accomplish a shortening of the overall length of the tubular transport tool 800, the rear portion 204 of the trestle 200 may be folded over. The rear portion 204 is folded over by means of a pin connection. In this respect, the rear portion 204 is joined to the trestle 200 by a pin 206 that allows the rear portion 204 to move from a first lower position in the longitudinal plane of the trestle 200. In one arrangement, the rear portion 204 is approximately 8 feet in length.

Preferably, the tubular transport tool 800 is positioned on a base frame 240, as illustrated in FIG. 8. The base 240 is shown schematically as a line in FIG. 8, and is seen placed on top of the catwalk 190. In one arrangement, the base 240 comprises a pair of parallel bars 248 that serve as a guide system for the trestle 200. In this respect, the guide system slidably receives the rear portion 204 of the trestle 200 as the forward end 202 moves upward towards the rig floor 812 during tool 800 operation. Preferably, the guide system bars 248 define parallel channels.

The tubular transport tool 800 next comprises an inclined ramp 500. In FIG. 8, it can be seen that the ramp 500 is pivotally connected to the trestle 200 at the trestle's front end 202. The ramp 500 has been inclined against the rig 810 and may be supported by a V-Door ramp 16, as shown in FIG. 8. In the preferred embodiment, the ramp 500 is extendable in height.

The ramp 500 defines an essentially U-shaped frame made up of a plurality of beams and lattices. The ramp 500 has an upper end 504 and a lower end 502. Preferably, the lower end 502 is pivotally connected to the base 240, thereby allowing the ramp 500 to be rotated between a folded over position for transport, and an unfolded position for operation.

Figure 9:
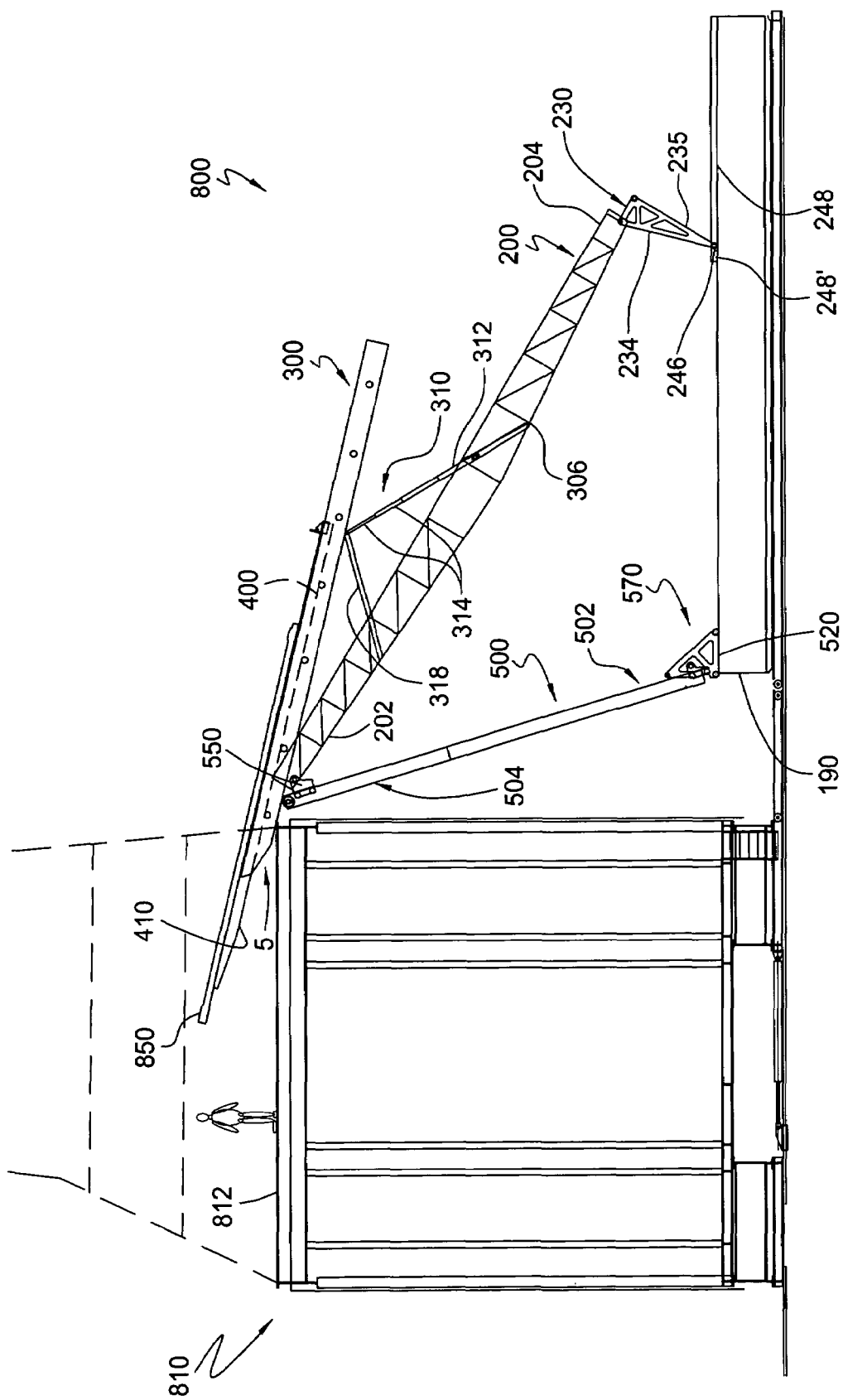
FIG. 9 is another side view of the tubular transport tool of FIG. 8. In this view, the trestle has been raised by a conveyor to the top of an inclined ramp. A trough carrier transport mechanism is being used to both raise and translate forward the trough carrier from the trestle. It can be seen that a tubular has been delivered to the rig floor.

FIG. 9 presents another side view of the tubular transport tool 800 of FIG. 8. In FIG. 9, the inclined ramp 500 is in its extended position against the rig 810. Preferably, the ramp 500 is rested against an already-in-place V-door ramp 16. In this view, the trestle 200 has been raised to the top of the inclined ramp 500. A tubular 850 has been delivered to the rig floor 812.

Various arrangements may be provided for the pivoting connection between the ramp 500 and the base 240. In one embodiment, the ramp rotation mechanism 510 includes at least one hydraulic cylinder and a pair of triangular frames 520. The hydraulic cylinder and the triangular frames 520 are positioned at the lower end 502 of the ramp 500. As shown in FIG. 8, the lower end 502 is pivotally pinned to ramp rotation frames 520 (only one shown). The pivoting connection allows the ramp 500 to pivot relative to the trestle 200. Actuation of the hydraulic cylinder causes the inclined ramp 500 to be moved between extended and retracted positions. As noted above, the ramp 500 is in its extended position in FIG. 8.

As noted in connection with FIGS. 8A and 8B, the tubular transport tool 800 also comprises a carriage 5, which includes a trough carrier 300 and a trough 400. The trough carrier 300 defines an elongated frame made up of a plurality of beams and lattices. The trough carrier 300 has an open top for receiving a trough 400. The open top forms an upper receiving surface 316 for receiving the trough 400. The trough carrier 300 resides within the U-shaped trestle 200 on the upper receiving surface 216, and is nested between the trestle 200 and the trough 400.

The trough carrier 300 is connected to the trestle 200 by means of a trough carrier transport mechanism 310. The trough carrier transport mechanism 310 is provided for selectively moving the trough carrier 300 relative to the trestle 200. One embodiment of a trough carrier transport mechanism 310 is shown in FIG. 9. Preferably, the trough carrier transport mechanism 310 defines a hydraulically operated cylinder 312 having at least one telescoping section 314. The hydraulically operated cylinder 312 is pivotally fastened to the trestle 200 proximate to the rear portion 204 of the trestle 200 by a pin 306. The hydraulically operated cylinder 312 is oriented so that the telescoping section(s) 314 extend outward towards the forward portion 202 of the trestle 200. Thus, extension of the telescoping section(s) 314 serves to extend the trough carrier 300 partially out of the trestle 200 and towards the drilling rig 810. A brace 318 is also provided to assist the telescoping section(s) 314 in lifting the trough carrier 300. The brace 318 is pivotally pinned to the trestle 200 at one end, and to the telescoping section 314 at the other.

FIG. 9 is another side view of the tubular transport tool 800 of FIG. 8. In this view, the trestle 200 has been raised by a conveyor 550 to the top of the inclined ramp 500. The trough carrier 300 can be seen raised relative to the trestle 200. The trough carrier transport mechanism 310 is being used to both rotationally raise and translate forward the trough carrier 300 from the trestle 200. It can also be seen in FIG. 9 that a tubular 850 has been delivered to the rig floor 812.

As noted, the carriage 5 also comprises a trough 400. The trough 400 defines an elongated frame configured to cradle a tubular, such as a drill pipe 850 or other pipe employed in drilling a well. The trough 400 is longitudinally movable relative to the trough carrier 300. A trough transport mechanism 410 is provided for selectively moving the trough 400 along the trough carrier 300, and then retracting the trough 400 back into the trough carrier 300. Preferably, the trough transport mechanism 410 also defines a hydraulically operated cylinder having at least one telescoping section. Thus, extension of the telescoping section serves to extend the trough 400 partially out of the trough carrier 300 and towards the drilling rig 810. Of course, other means for sliding the trough 400 relative to the trough carrier may be employed.

As can be seen in FIG. 9, the front end 202 of the trestle 200 is carried upwards toward the rig floor 812 along the inclined ramp 500. The connection between the front end 502 of the trestle 200 and the ramp 500 is by means of a conveyor 550. The conveyor 550 is designed to transport the forward end 202 of the trestle 200 between the upper 504 and lower 502 ends of the ramp 500. In one arrangement, the conveyor 550 comprises a U-shaped channel body that has rollers on opposite ends. The conveyor 550 may be connected to a transport mechanism 570 to move the conveyor 550 along the ramp 500. In one embodiment, the transport mechanism 570 provides a chain having one end anchored to a lower end 502 of the ramp 500 and the other end connected to the conveyor 550. A piston and cylinder assembly may be operatively coupled to a middle portion of the chain such that extension of the piston will cause the unanchored end of the chain to rise relative to the catwalk 190, thereby raising the conveyor 550. In this respect, the transport mechanism 570 provides a two-to-one ration of extension-to-lift.

In operation, the ramp 500 is raised from its nested position within or immediately above the trestle 200. The ramp 500 is preferably positioned against an already-existing V-Door ramp for support. For safety reasons, the top 504 of the ramp 500 should be tied to the rig floor 812 at this point before any joints of pipe 850 are picked up.

The hydraulic cylinder of the transport mechanism 570 is next actuated to lift the conveyor 550 upward along the ramp 500 from a starting point at the level of the catwalk 190. As noted, the forward portion 202 of the trestle 200 is pivotally pinned to the conveyor 550. Rollers are positioned within the frame 500 on either side of the trestle 200. The rollers ride within the guide system for the conveyor 550 defined by the frame. As the conveyor 550 is raised along the ramp, the forward portion 202 of the trestle 200 is raised to a level at or above the rig floor 812.

An additional optional feature of the trestle 200 is a pair of articulating legs 230. The articulating legs 230 are rotatably connected to the rear portion 204 of the trestle 200. The articulating leg 230 is slightly shorter than the rear portion 204 of the trestle 200.

As shown in FIG. 8, the articulating leg 230 in one embodiment defines a triangular truss type member having an upper hypotenuse leg 235 and a slightly shorter base leg 234. A third leg 236 connecting the base 234 and hypotenuse 235 legs is a much shorter leg. The shorter leg 236 connects the ends of the legs 234, 235 to form the triangular articulated leg 230.

Each upper leg 234 is connected to the back portion of the trestle 200. The base 234 and hypotenuse 235 legs, in turn, each meet at a pin which carries a roller 246. The rollers 246 move in a track 248 along the base 240.

The track 248 serves as a guide system for the trestle 200 as it is moved. The track 248 includes a pair of stop members 248' at the forward end of the rear portion 204 of the trestle 200. The stop members 248' limit the forward movement of the rollers 246 on the articulating legs 230. When the front end 202 of the trestle 200 is raised along the inclined ramp 500 into the raised position shown in FIG. 9, the back end 204 of the trestle 200 is first moved forward until the rollers 246 engage the stops 248'. From there, the articulating legs 230 pivot so as to cause the rear portion 204 of the trestle 200 to be raised. With this arrangement, no independent vertical assist is required to lift the back end 204 of the trestle 200. Raising the back end 204 of the trestle 200, in turn, reduces the approach angle of the pipe joints 850 as they are delivered to or removed from the rig floor 812.

The tool 800 may also include a loading arm 630 for loading pipe 850 from the pipe racks into the trough 400 of the tool 800, and vice versa. In one embodiment, the loading arm 630 is disposed on a side of the trestle frame 240. In this way, the arm 630 may readily access pipe 850 on the pipe racks adjacent the catwalk 190. Optionally, additional loading arms 630 may be disposed on each side of the trestle 200. In this manner, a loading arm 630 can receive pipe on one side of the trestle 200 during the pick-up phase, and deliver pipe to the opposite side of the trestle 200 during the laydown phase.

The loading arm 630 is preferably hydraulically operated. First, a cylinder may be actuated to translate the arm 630 up and down along the sides of the trestle 200. The loading arm 630 typically lifts transverse to the trestle 200, or may be configured to rotate along the longitudinal plane of the trestle 200. The loading arm 630 begin in the down position when bringing pipe 850 over to the side of the tool 800. The arms 630 then rotate upward and carry the pipe 850 to the top of the trestle frame 200 where the pipe 850 rolls off the loading arm 630 and into the trough 400. The loading arm 630 remain in a raised position as the trestle 200 is elevated by the conveyor 550 throughout the raise and lower cycles.

It is preferred that the tubular transport tool 800 be completely hydraulically controlled. Those of ordinary skill in the art will appreciate that the presence of electrical components near a working drilling rig creates a risk of fire and explosions. Therefore, a purely hydraulic system is demonstrated herein.

Figure 2:
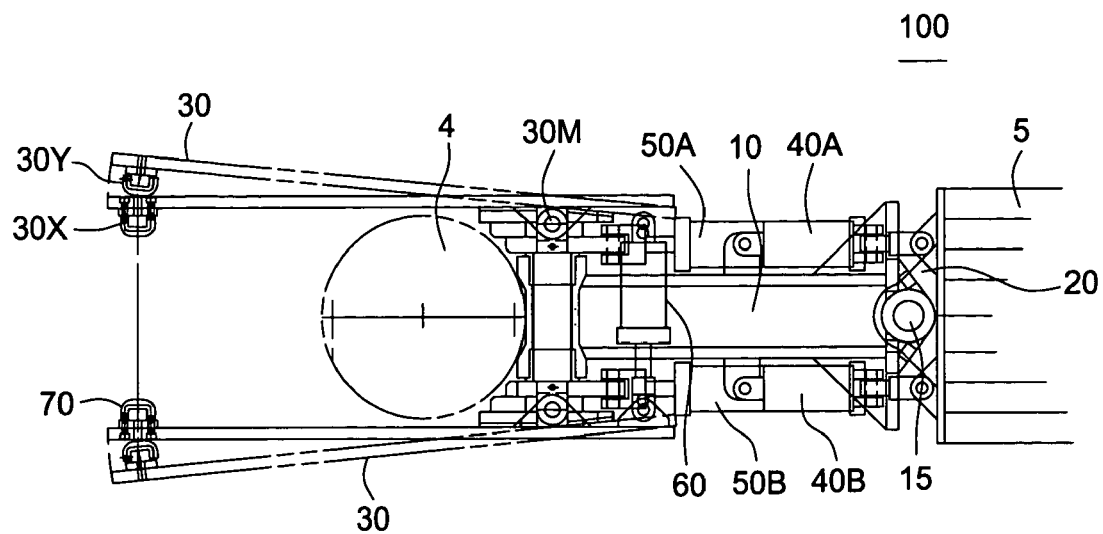
FIG. 2 is a top view of the pipe handling apparatus of FIG. 1 showing the open and close position of the apparatus.
Figure 3A:
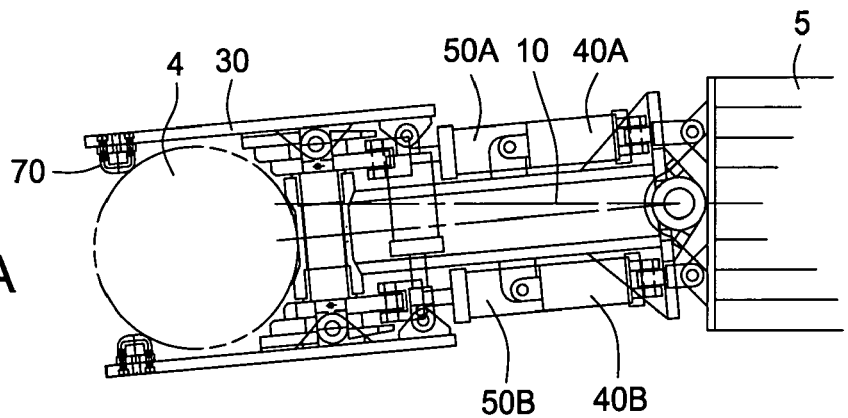
FIGS. 3A-B is a top view of the pipe handling apparatus of FIG. 1 after it has been pivoted relative to the trough.
Figure 3B:
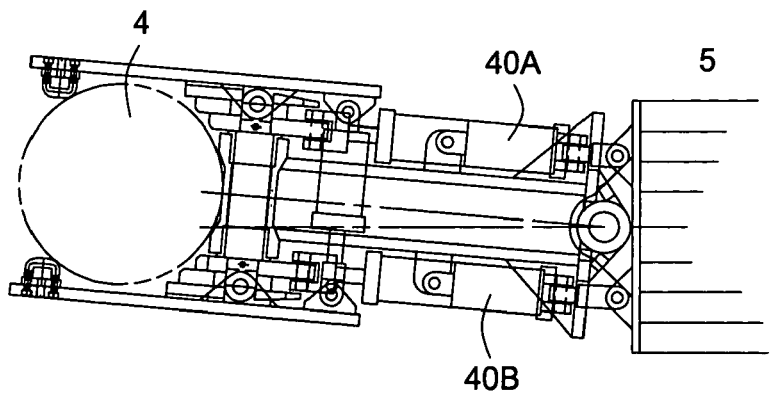

Referring back to FIG. 2, the pipe handling apparatus 100 includes a body 10 pivotally coupled to a base 20 at one end and pivotally coupled to at least one positioning arm 30 at another end. The base 20 may be mounted to the end of the carriage 5 in any manner known to a person of ordinary skill. In one embodiment, a pin and hinge assembly 15 may be used to couple the base 20 to the body 10. The body 10 may be pivoted relative to the carriage 5 using one or more biasing mechanisms 40A, 40B. In one embodiment, a piston and cylinder assembly 40A, 40B may be disposed on either side of the base 20 as shown in FIGS. 1, 3A, and 3B. Each piston and cylinder assembly 40A, 40B is pivotally connected to the base 20 and the body 10. The pair of piston and cylinder assembly 40A, 40B may be operated to pivot the pipe handling apparatus 100 in either the right or left direction relative to the carriage 5 as shown in FIGS. 3A and 3B. In FIG. 3A, the right piston and cylinder assembly 40A is extended relative to the left piston and cylinder assembly 40B, thereby pivoting the pipe handling apparatus 100 to the left relative to the carriage 5. In FIG. 3B, the left piston and cylinder assembly 40B is extended relative to the right piston and cylinder assembly 40A, thereby pivoting the pipe handling apparatus 100 to the right relative to the carriage 5.

The pipe handling apparatus 100 is equipped with at least one positioning arm 30. In one embodiment, a positioning arm 30 is disposed on either side of the distal end of the body 10. Each arm 30 is coupled to the body 10 at a middle portion 30M of the positioning arm 30 as illustrated in FIG. 2. The arms 30 are coupled to the body 10 in a manner allowing at least a portion of the arm 30 to be lowered or raised relative to the body 10. Preferably, the positioning arms 30 are actuated using a second pair of piston and cylinder assembly 50A, 50B. Each piston and cylinder assembly 50A, 50B is attached between the proximal end of the body 10 and an end of the positioning arm 30. As shown in FIG. 1, when the piston and cylinder assembly 50A, 50B is retracted, the positioning arm 30 is placed in the traveling position 30A. When the piston and cylinder assembly 50A, 50B is extended, the positioning arm 30 is pivoted about the body 10, thereby placing the free end of the positioning arm 30 in the raised/contact position 30B (shown in dotted line). Although two piston and cylinder assembly 50A, 50B, it must be noted that the positioning arms may also be raised or lowered with only one piston and cylinder assembly.

The positioning arms 30 may also be opened and closed to receive a pipe 4 between the positioning arms 30 and the distal end of the body 10 as illustrated in FIG. 2. In addition to being raised and lowered, the positioning arms 30 are coupled to the body 10 in a manner allowing the positioning arms 30 to pivot between an open position 30Y and a closed position 30X. Preferably, a piston and cylinder assembly 60 is used to link and actuate one end of the positioning arms 30. When the piston retracts, the linked ends of the positioning arms 30 are brought closer together. In turn, the free ends of the positioning arms 30 pivot outward, thereby placing the positioning arms 30 in the open position 30Y.

The free end of each positioning arm 30 may be equipped with a stop member 70. In one embodiment, the stop member 70 comprises a roller. Preferably, the stop members 70 are releasably attached to the positioning arms 30. The size of the stop members 70 may be determined from the size of the pipe 4 being handled. Preferably, the selected stop members 70 are able to retain the pipe 4 between the positioning arms 30 when the arms 30 are in the closed position 30X and release the pipe 4 when the positioning arms 30 are in the open position 30Y.

Figure 4:
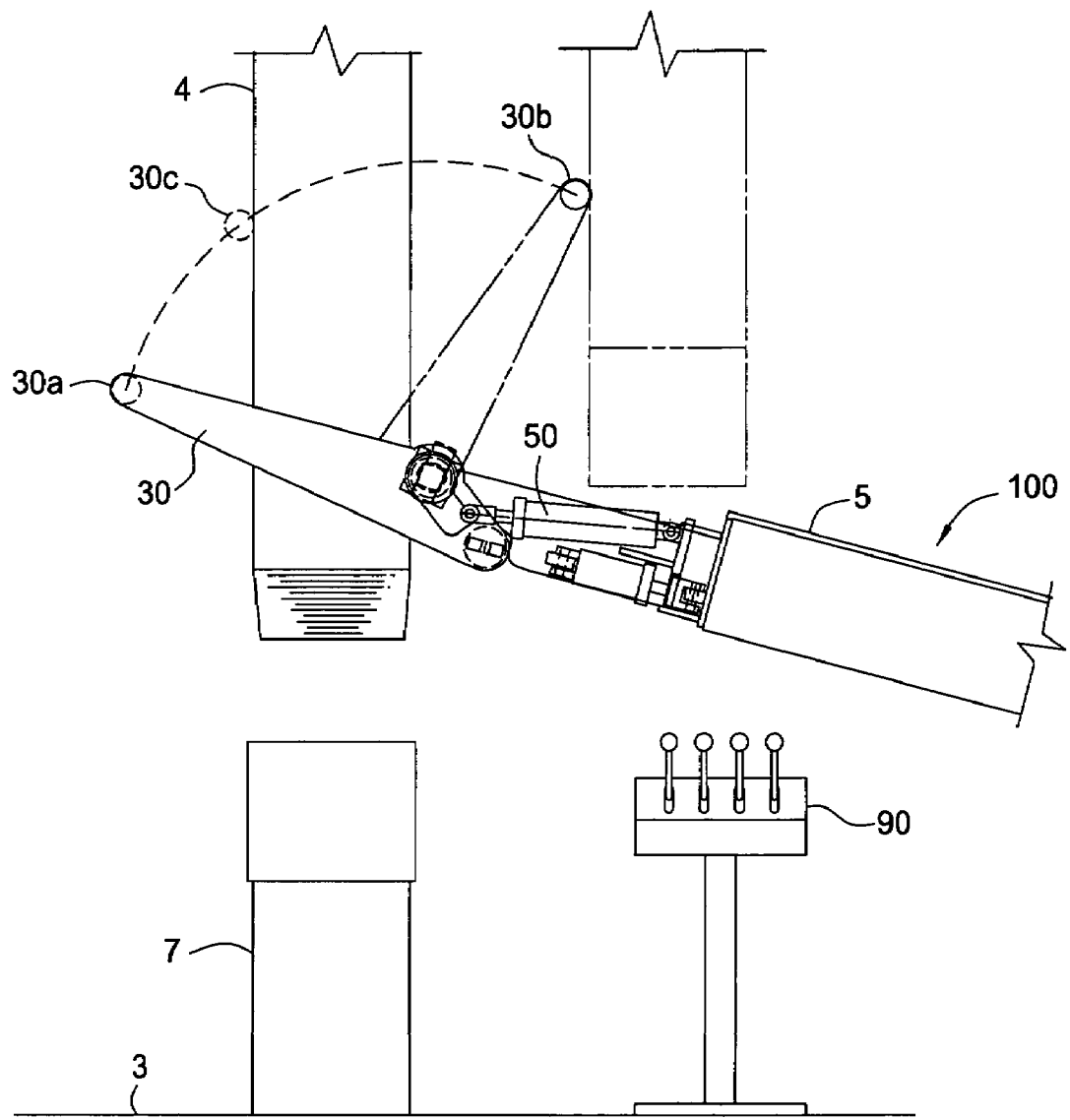
FIG. 4 shows another embodiment of a pipe handling apparatus according to aspects of the present invention.

In another aspect, the control panel 80 of the pipe handling apparatus 100 may be attached to the apparatus 100 itself as shown in FIG. 1. The control panel 80 may include controls for raising and lowering the positioning arms 30, opening and closing the positioning arms 30, and pivoting the pipe handling apparatus 100 to the left or right. In another embodiment, the controls may be located on the control console 90 for controlling the movement of the carriage 5 as illustrated in FIG. 4.

In operation, a carriage 5 supporting a pipe 4 is raised to the rig floor 3 and moved closer to a second pipe 7 in the wellbore. During this process, the positioning arms 30 are in the traveling position 30A as shown in FIG. 1. Preferably, the box end of the pipe 4 extends beyond the end of the carriage 5 to facilitate attachment by an elevator (not shown) to the pipe 4.

Figure 5:
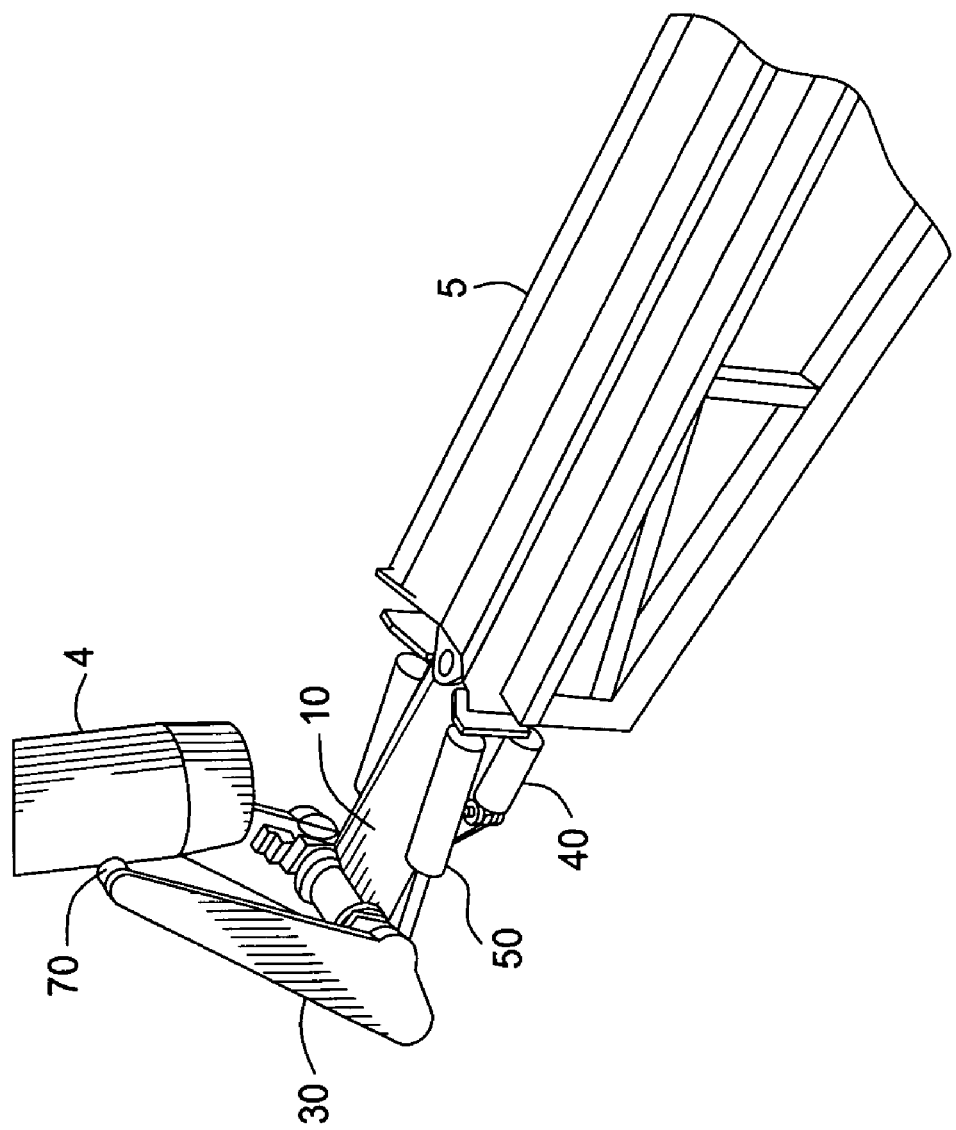
FIG. 5 shows the positioning arms of the pipe handling apparatus in the raised position.

Once the pipe 4 is attached to the elevator, the operator may move from the control console 90 to the control panel 80 of the pipe handling apparatus 100. As the pipe 4 is raised by the elevator, the positioning arms 30 may be raised by actuating the piston and cylinder assemblies 50A, 50B. The positioning arms 30 are raised until the stop members 70 contact the free end of the pipe 4 as illustrated by the dotted lines 30B in FIG. 1. FIG. 5 is another view of the positioning arms 30 in the contact position 30B. After the stop members 30 contact the pipe 4, the carriage 5 may be moved toward the wellbore as the elevator lifts the pipe 4 further. In this manner, the free end of the pipe 4 may be supported by the stop members 70 and kept under control. If desired, the positioning arms 70 may be raised slightly to remove the thread protectors (not shown) from the pipe 4. Preferably, the length of the positioning arm 30 is sufficient to allow removal of any thread protectors disposed on the pipe 4.

Figure 6:
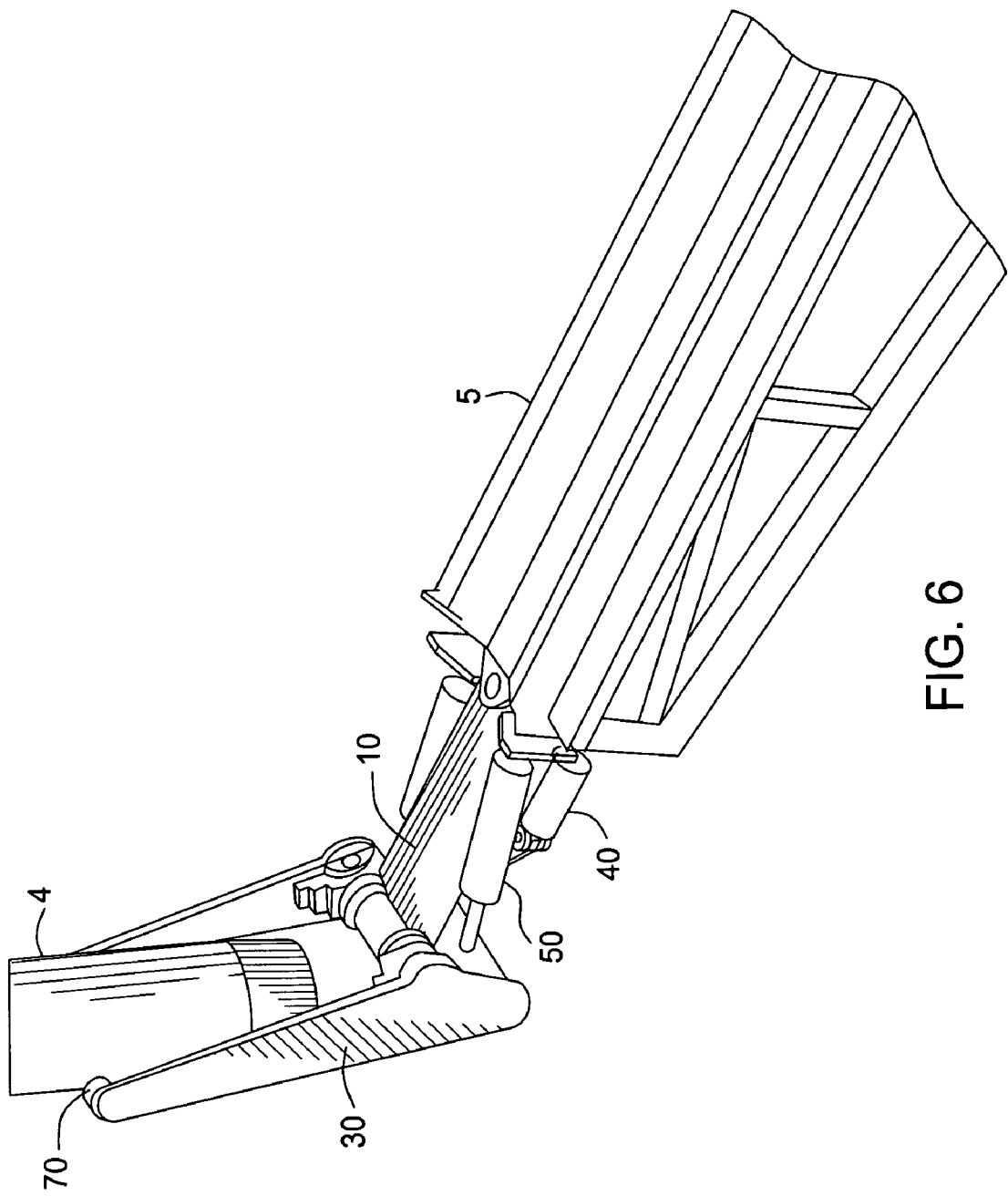
FIG. 6 shows the positioning arms of the pipe handling apparatus in a lowered position.
Figure 7:
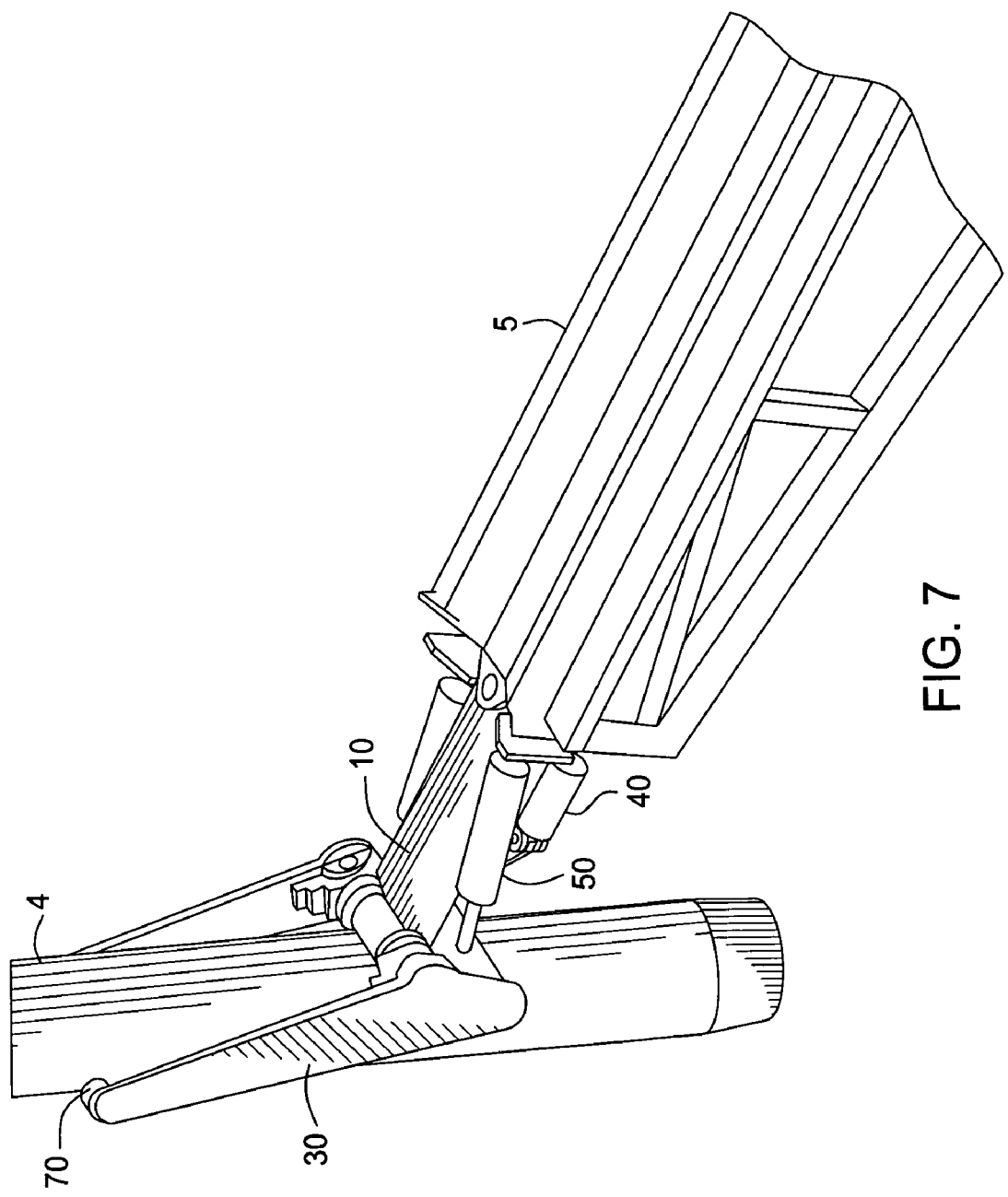
FIG. 7 shows a pipe being trapped between the positioning arms and the body of the pipe handling apparatus.

To place the pipe 4 in the stabbing position, the positioning arms 30 are lowered by retracting the pistons of assemblies 50A, 50B until the pipe 4 clears the end of the body 10 of the pipe handling apparatus 100 as illustrated in FIG. 6. Thereafter, the pipe 4 is lowered past the positioning arms 30 as shown in FIG. 1. In this position, the pipe 4 is disposed between the positioning arms 30 and the distal end of the body 10. Subsequently, the positioning arms 30 may be raised to retain or trap the pipe 4 between the stop members 70 and the distal end of the body 10. The trapped position 30C of the positioning arms 30 is shown in dotted lines of FIG. 1. FIG. 7 also shows the pipe 4 trapped between the stop members 70 and the distal end of the body 10.

The pipe 4 may now be placed in the final stabbing position by manipulating the carriage 5 and/or the pipe handling apparatus 100. The free end of the pipe 4 may be moved forward or backward by moving the carriage 5 by means of the trough transport mechanism 410. Also, the free end may be moved to the left or right by moving the pipe handling apparatus 100. In this manner, the pipe 4 may be aligned with the second pipe 4 in the wellbore.

After the pipe 4 is stabbed, the positioning arms 30 and the carriage 5 may be removed from the rig floor 3. Initially, the positioning arms 30 are opened 30Y to allow the carriage 5 to backed away from the pipe 4. After the pipe 4 passes between the stop members 70, the positioning arms 30 may be closed 30X and lowered to the travel position 30A. Finally, the carriage 5 may continue to be retracted and removed from the rig floor 3.

In another embodiment, the pipe handling apparatus 100 may be extendable or retractable relative to the tubular transport tool 800. For example, the pipe handling apparatus 100 may be operatively coupled to the tubular transport tool 800 using a piston and cylinder assembly. In this respect, the pipe handling apparatus 100 may be extended to move the tubular 4 toward the wellbore without moving the tubular transport tool 800.

While the foregoing is directed to embodiments of the present invention, other and further embodiments of the invention may be devised without departing from the basic scope thereof, and the scope thereof is determined by the claims that follow.

The invention claimed is:

1. A method of positioning a tubular above a wellbore, comprising:
   providing a carriage having a wellbore end and a distal end;
   fixing a tubular handling apparatus to the wellbore end of the carriage, the tubular handling apparatus having a body connected to the carriage and two arms connected to the body;
   placing the tubular in the carriage while the carriage is in a substantially horizontal position at an elevation below a rig floor;
   supporting a majority of the tubular along a longitudinal axis of the tubular with the carriage;
   moving the carriage with the tubular handling apparatus to a position wherein the wellbore end, the tubular handling apparatus and a first end of the tubular are over the rig floor;
   lifting the first end of the tubular with a hoisting member;
   moving a second end of the tubular along the carriage as the hoisting member lifts the first end;
   engaging the second end of the tubular with the two arms while the second end is substantially over the carriage;
   pivoting the two arms about a first pin coupled to the body thereby pivoting the arms in a first plane relative to the body and the carriage, wherein the first plane is a substantially vertical plane;
   moving the second end of the tubular from the position over the carriage to a substantially vertical position wherein the tubular is above the wellbore by the pivoting of the two arms in the first plane;
   aligning the second end of the tubular with a tubular string suspended from the rig floor by pivoting the body about a second pin coupled to the carriage thereby pivoting the body and the arms relative to the carriage and moving the second end of the tubular in a substantially horizontal direction normal to a longitudinal axis of the carriage;
   engaging the second end of the tubular with the tubular string;
   pivoting each of the two arms in a second plane relative to the body and away from the tubular thereby disengaging the tubular from the arms; and
   moving the carriage and the tubular handling apparatus back to the horizontal position at the elevation below the rig floor.

2. The method of claim 1, further comprising preventing swinging of the second end of the tubular when removing the second end of the tubular from the carriage with the two arms.

3. The method of claim 1, wherein the first pin is in a substantially horizontal position.

4. The method of claim 3, wherein the second pin is in a substantially vertical plane and normal to the longitudinal axis of the carriage.

5. The method of claim 1, wherein each of the two arms are on opposite sides of the tubular while moving the tubular from the carriage to the tubular string.

6. The method of claim 1, wherein moving the carriage with the tubular handling apparatus to further comprise moving the wellbore end of the carriage up a ramp attached to the rig floor.

7. The method of claim 6, further comprising reducing an angle of approach of the carriage and tubular by lifting the distal end of the carriage when the wellbore end of the carriage is over the rig floor.

8. An apparatus for handling a tubular, comprising:
   a carriage configured to support a majority of a tubular along a longitudinal axis of the tubular;
   a system of tubular transport actuators configured to move the carriage and the tubular from a horizontal position below a rig floor to a position wherein a wellbore end of the carriage and a first end of the tubular are above the rig floor;
   a pin and hinge connection fixed to the wellbore end of the carriage;
   a body of a tubular handling apparatus pivotally coupled to the pin and hinge connection thereby allowing the body to pivot relative to the carriage;
   two arms coupled to an opposite end of the body at an intermediate point on each of the arms, wherein each of the arms have an engagement end configured to engage a second end of the tubular, wherein the arms are configured to engage the second end of the tubular when the tubular is being lifted by a hoisting member and the second end is located over the carriage;
   a first actuator coupled to the body and the carriage, wherein the first actuator is configured to pivot the body and thereby the arms relative to the carriage about a pin of the pin and hinge connection, wherein the pin is in a substantially vertical plane;
   a second actuator coupled to the body and each of the two arms, wherein the second actuator is configured to pivot each of the two arms about an axis at the second end of the body and in a first plane relative to the body and the carriage, wherein the first plane is substantially vertical;

a third actuator coupled to each of the arms and configured to pivot the arms in a second plane relative to the body and the carriage in order to disengage the tubular; and wherein the arms are configured to move the second end of the tubular from the carriage to a location over the wellbore using the second actuator and align the tubular with a tubular string supported from the rig floor using the first actuator.

9. The apparatus of claim 8, wherein the pin is normal to a longitudinal axis of the carriage.

10. The apparatus of claim 9, wherein the arms have an actuation end on one side of the intermediate point and a tubular engagement end on the other side of the intermediate point and the third actuator couples to the actuation end.

11. A method of positioning a tubular above a wellbore, comprising the steps of:

first: placing the tubular in a carriage in a substantially horizontal position, wherein the carriage is coupled to a tubular handling apparatus;

second: moving a wellbore end of the carriage up a ramp attached to a rig floor, thereby moving the tubular and the tubular handling apparatus with the carriage;

third: locating the wellbore end of the carriage, a first end of the tubular and the tubular handling apparatus above the rig floor;

fourth: lifting the first end of the tubular from an elevator;

fifth: moving a second end of the tubular along the carriage;

sixth: engaging the second end with two arms of the tubular handling apparatus;

seventh: removing the second end from the carriage while preventing swinging of the second end of the tubular with the two or more arms;

eighth: moving the second end from a location over the carriage to a vertical position over the wellbore by pivoting the two arms in a first plane relative to a body of the tubular handling apparatus and the carriage;

ninth: aligning the second end with a tubular string hung from the rig floor by pivoting the body and thereby the arms relative to the carriage thus moving the second end of the tubular horizontally and substantially perpendicular to the carriage; and tenth: pivoting the arms in a second plane relative to the body and the carriage thereby releasing the second end of the tubular from the tubular handling apparatus.

* * * * *